United States Patent [19]

Ono et al.

[11] 4,366,993
[45] Jan. 4, 1983

[54] GAS BEARINGS

[75] Inventors: Kyosuke Ono, Kodaira; Koshi Murata, Hoya, both of Japan

[73] Assignee: Nippon Telegraph & Telephone Corp., Japan

[21] Appl. No.: 110,029

[22] Filed: Jan. 7, 1980

[51] Int. Cl.³ .............................................. F16C 32/06
[52] U.S. Cl. ................................. 308/9; 308/DIG. 1
[58] Field of Search .............................. 308/9, DIG. 1

[56] References Cited

U.S. PATENT DOCUMENTS

| | | | |
|---|---|---|---|
| 3,070,407 | 12/1962 | Hughes | 308/9 |
| 3,110,528 | 11/1963 | Parker | 308/9 |
| 3,420,583 | 1/1969 | Hirs | 308/9 |
| 3,517,973 | 6/1970 | Hirs | 308/9 |
| 3,753,016 | 8/1973 | Klein | 308/9 |
| 3,934,948 | 1/1976 | Pruvot | 308/9 |
| 4,043,613 | 8/1977 | Freese | 308/9 |
| 4,197,061 | 4/1980 | Hill | 308/9 |

FOREIGN PATENT DOCUMENTS 54-133248  10/1979  Japan ........................... 308/DIG. 1

Primary Examiner—Richard R. Stearns
Attorney, Agent, or Firm—Townsend and Townsend

[57] ABSTRACT

In a gas bearing, a plurality of axially spaced circumferential annular grooves are provided for a bearing or a rotary shaft supported thereby. The annular grooves are located near opposite ends of the bearing and connected to a source of pressurized gas through a plurality of angularly spaced gas supply ports.

14 Claims, 17 Drawing Figures

GAS BEARINGS

BACKGROUND OF THE INVENTION

This invention relates to a gas bearing and more particularly, a hydrostatic and hybrid gas bearing utilizing a hydrostatic effect and a hydrodynamic effect and being capable of efficiently operating with a small bearing clearance of less than 10 microns.

Such a bearing is indispensable for high speed operation of a mass storage memory device utilizing a rotating head recording device. The rotating head recording device is more advantageous than the prior art fixed head magnetic tape recording device in that it can record at a high recording density and it can decrease the size of the recording device. But it has such defects that its data transfer rate is low and sequential access time is long. This is because the rotating speed of the presently available rotating head is 5600 r.p.m. and the head scanning speed is also low, for example, 25.4 m/s. If one succeeds in increasing the rotating speed to about 15,000 r.p.m. and the head scanning speed to about 50 m/s, the problems described above can be eliminated. Increase of the speed above 10,000 r.p.m. is impossible with a ball bearing because of its poor reliability so that it is essential to use an air bearing.

The rotating head recording device utilizing a hydrostatic type and/or hydrodynamic type air bearing is now being used for broadcasting VTR. However, the hydrostatic type air bearing requires a reciprocating compressor so that it is difficult to adapt such a recording device to the computer peripheral equipment. On the other hand, in the hydrodynamic type air bearing, since the shaft and bearing are in contact with each other before starting, it lacks reliability when used in the rotating head recording device for electronic computers which are required to operate for several years without resort to any maintenance or repairs. Accordingly, it has been desired to provide a hybrid gas bearing (that is a bearing which supports the shaft by hydrostatic pressure at the time of starting and stopping, whereas by the hydrodynamic pressure during rotating) that can operate with high efficiencies by using pressurized air having a pressure of about 0.08 kg/cm$^2$ created by a conventional blower, in order that a highly reliable, high speed rotating head recording device which can start and stop in a contactless condition can be obtained.

Prior to this invention, to operate a hydrostatic gas bearing of so-called inherent restrictor type, it has been necessary to use a reciprocating compressor as has been pointed out above because the bearing efficiency (the ratio between supplied air pressure and pressure available to support a shaft) is low, for example, about 50% at the most. In addition, since the optimum bearing clearance is large, the bearing stiffness (bearing efficiency/bearing clearance) is small. In other words, in the conventional bearing, it has been impossible to decrease the optimum bearing clearance below 10 microns without appreciably decreasing the bearing efficiency. For this reason, in the bearing of this type, it has been impossible not only to sufficiently increase the bearing stiffness but also to effectively utilize the hydrodynamic effect created in a small bearing clearance at the time of high speed running for the sake of effectively operating the bearing as a hybrid gas bearing.

In order to eliminate at least a portion of the defect of the inherent restrictor type bearing, a surface restrictor type bearing has been proposed in which the optimum bearing clearance was reduced in less than 10 microns, and a bearing pressure for supporting a load is effectively created in a region including the bearing ends providing a bearing efficiency substantially equal to that of the inherent restrictor type bearing and a higher bearing stiffness. However, the surface restrictor type bearing must be provided with many longitudinal axial slots which are difficult to machine. Moreover, as such longitudinal slots make discontinuous the bearing surface in the relative slip direction, this prevents effective use of the hydrodynamic effect created by the rotation of the shaft so that this type of bearing can not operate as a hybrid gas bearing.

SUMMARY OF THE INVENTION

Accordingly, it is an object of this invention to provide an improved hydrostatic gas bearing having a high bearing efficiency and stiffness which is easy to manufacture.

Another object of this invention is to provide a high efficiency hybrid gas bearing which, at the time of starting and stopping a shaft, can support the shaft in contactless manner by utilizing low pressurized air generated by a small rotary compressor operable over a long time without oiling, and which can support the shaft by the hydrodynamic effect created by the rotation of the shaft during high speed rotation.

According to this invention, there is provided a gas bearing of the type wherein compressed gas is supplied from a source thereof to a bearing clearance between a bearing and a rotating shaft for rotatably supporting the same, characterized in that the bearing is provided with a plurality of circumferential annular grooves extending about the entire inner surface of the bearing and axially spaced from each other and opened to the bearing clearance, a plurality of angularly spaced small diameter gas supply ports communicating with respective annular grooves, and a gas passage for connecting the plurality of gas supply ports to the source of compressed gas.

BRIEF DESCRIPTION OF THE DRAWINGS

Other objects and advantages of the present invention can be more fully understood from the following detailed description taken in conjunction with the accompanying drawings, in which:

FIG. 10a is a sectional view showing another embodiment of this invention;

FIG. 10b is a plan view of the embodiment shown in FIG. 10a;

DESCRIPTION OF THE PREFERRED EMBODIMENTS

Before describing the invention, for the purpose of better understanding of the invention, one example of a prior art inherent restrictor type bearing and one example of a prior art surface restrictor type bearing will first be described.

Figures 1, 2:
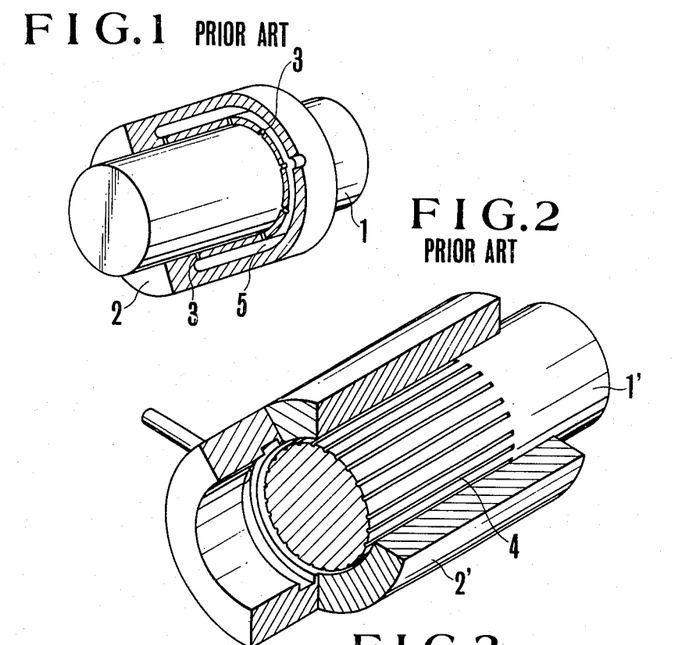
FIG. 1 is a perspective view, partly broken away, showing one example of a prior art inherent restrictor type hydrostatic gas bearing.
FIG. 2 is a perspective view, partly broken away, showing one example of a prior art surface restrictor type hydrostatic gas bearing.

In a prior art inherent restrictor type hydrostatic journal gas bearing 2, there are provided a plurality of air supply ports 3 opened to the bearing surface and spaced apart in circumferential and axial directions, a common air supply channel 5 in communication with the air supply ports 3 and supplied with pressurized air from a compressor (not shown). The bearing is used to support a shaft 1. Although not shown, the openings of the air supply ports 3 facing the shaft may be partially flared to form shallow pools, thus forming an orifice restrictor type bearing.

Although the inherent restrictor type or the orifice restrictor type bearing can be readily machined, its bearing efficiency is 50% at the most. And, since its optimum bearing clearance is large, the bearing stiffness is small.

Figure 3:
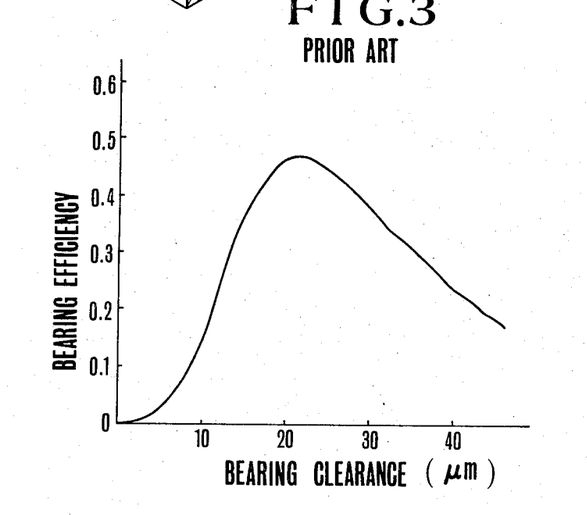
FIG. 3 is a graph showing the relationship between the bearing efficiency and the bearing clearance in the prior art inherent restrictor type hydrostatic gas bearing of FIG. 1.

FIG. 3 shows the relationship between the bearing efficiency and the bearing clearance of the bearings described above. Generally speaking, the optimum bearing clearance at which the efficiency becomes the maximum is large, for example, 20 to 30 microns or more, and with a small bearing clearance of less than 10 microns, the load carrying capacity of the bearing decreases greatly. The optimum bearing clearance can be decreased by decreasing the diameter of the air supply ports and the number thereof so as to increase the restriction effect (flow resistance to gas) of the air supply port. With present machining techniques, however, the minimum diameter of the air supply ports is 0.08 to 0.1 mm, so that it is impossible to decrease the optimum bearing clearance below 10 microns without sacrificing the bearing efficiency because the bearing efficiency decreases when the number of the air supply ports is decreased below 6. For this reason, in the bearing of this type, it has been impossible not only to sufficiently increase the bearing stiffness but also to make full use of the hydrodynamic effect created in a small bearing clearance at the time of high speed rotation for the sake of supporting the rotary shaft.

To partially eliminate the disadvantages of the inherent restrictor type and the orifice restrictor type bearings, a surface restrictor type bearing as shown in FIG. 2 has been developed in which the optimum bearing clearance has been reduced below 10 microns, and the bearing pressure effective to support the load is created up to the ends of the bearing, thus ensuring substantially the same bearing efficiency as the bearing of the above mentioned types and higher bearing stiffness. As shown in FIG. 2, in the surface restrictor type bearing, a plurality of longitudinally extending and circumferentially spaced apart grooves 4 are provided for a shaft 1' except those portions facing opposite ends of a bearing 2'. Thus, the surface restrictor type bearing should be provided with the plurality of longitudinal grooves requiring difficult machining. In addition, the hydrodynamic effect created by the rotation of the shaft 1' is not efficiently utilized. More particularly, the bearing clearance is not continuous in the circumferential direction but divided by the plurality of longitudinal grooves 4 and besides, the compressed air in the bearing tends to escape to the outside through these grooves so that the hydrodynamic effect is substantially lower than that of a bearing not provided with the longitudinal grooves.

The invention will now be described in detail with reference to those embodiments shown in the accompanying drawings.

Figure 4:
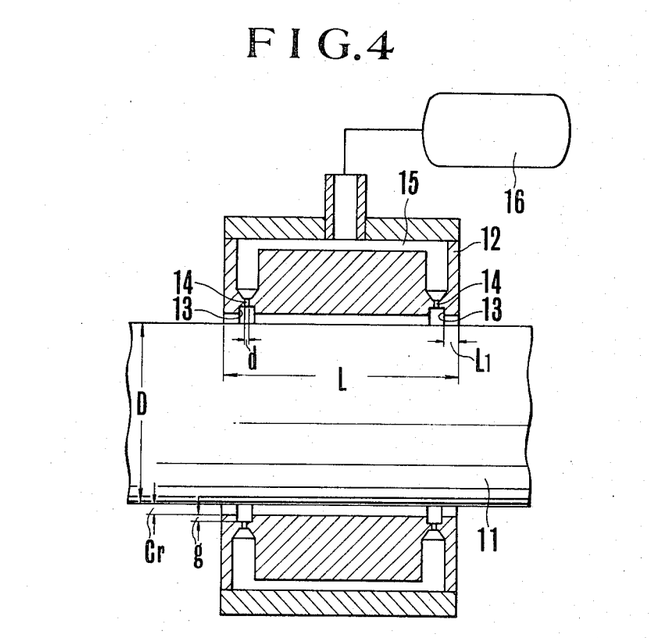
FIG. 4 is a longitudinal sectional view showing one embodiment of this invention.
Figure 5:
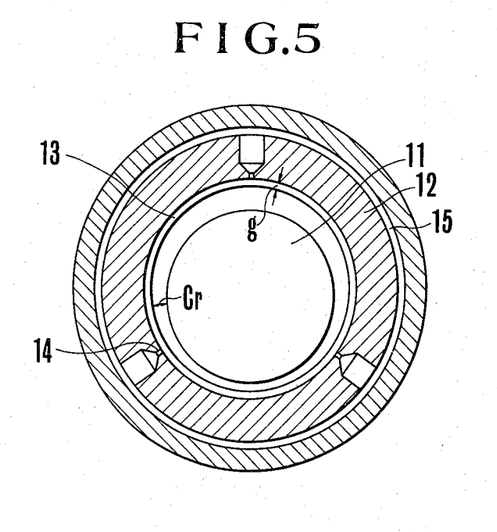
FIG. 5 is a cross-sectional view of the embodiment shown in FIG. 4.

An embodiment shown in FIGS. 4 and 5 comprises a shaft 11, a bearing 12, circumferentially extending, narrow annular grooves 13 which extend about the bearing periphery and which are located at positions spaced from the opposite ends of the bearing by a distance $L_1$ which is about 5 to 15% of the length L of the bearing, each groove having a depth g which is about 1.5 to 6 times the bearing clerance. In addition, the embodiment of FIGS. 4 and 5 includes, small diameter, radial air supply ports 14 opened to the annular grooves 13 and arranged in communication with a source of compressed air 16 via an air chamber 15. The number of the air supply ports 14 is selected to be smaller than that of the prior art gas bearing. The compressed air supplied from the source 16 flows into the narrow grooves 13 via air chamber 15 and air supply ports 14. The compressed air thus supplied flows through the grooves 13 in the circumferential direction and then flows to the outside through the bearing clearance.

It is advantageous to make the diameter of the air supply ports as small as possible, for example, less than 0.1 mm, and to select the number of ports to be about 3 or 4. As shown in FIG. 5, 3 air supply ports 14 are angularly spaced from each other at substantially equal circumferential spacing.

The optimum operating point of the hydrostatic air bearing is obtained when the flow resistance $R_1$ of a passage from the air chamber 15 to the bearing surface via air supply port 14 and narrow groove 13 becomes equal to the resistance $R_2$ of a passage in the bearing clearance between the side edges of the grooves 13 and the ends of the bearing. The flow resistance $R_1$ is inversely proportional to the square of the diameter d of the air supply ports and the number thereof, whereas the flow resistance $R_2$ is inversely proportional to three powers of the bearing clearance Cr (in FIG. 5 the clearance Cr. is shown exaggerated to illustrate an eccentric condition of the shaft) and directly proportional to the flow out length $L_1$. Flow out length $L_1$, diameter d of the air supply ports and the number thereof are made as small as possible for the purpose of satisfying a condition $R_1 \approx R_2$ in narrower bearing clearance Cr. As described above, according to this invention, the flow out length $L_1$ is made small in order to limit the flow out resistance and the number of the air supply ports is decreased to increase resistance to the flow of air whereby the flow-in resistance and the flow-out resistance are made equal to realize the optimum operating condition.

Figure 6:
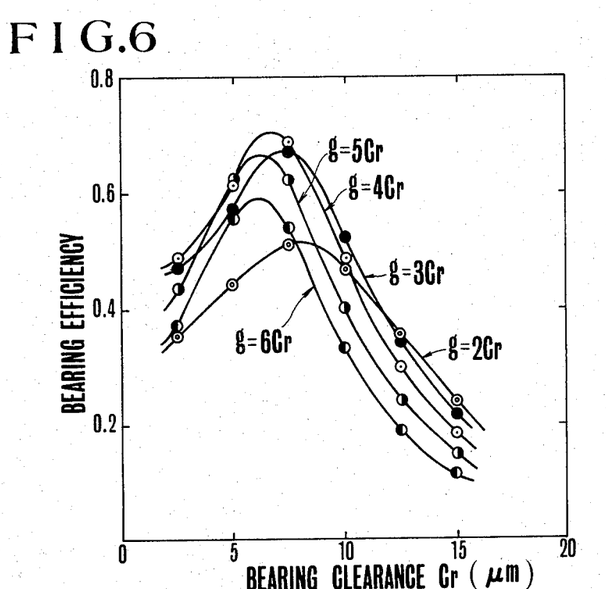
FIG. 6 is a graph showing the relationship between the bearing efficiency and the bearing clearance in the embodiment shown in FIG. 4, in which the depth of annular grooves is taken as a parameter.
Figure 7:
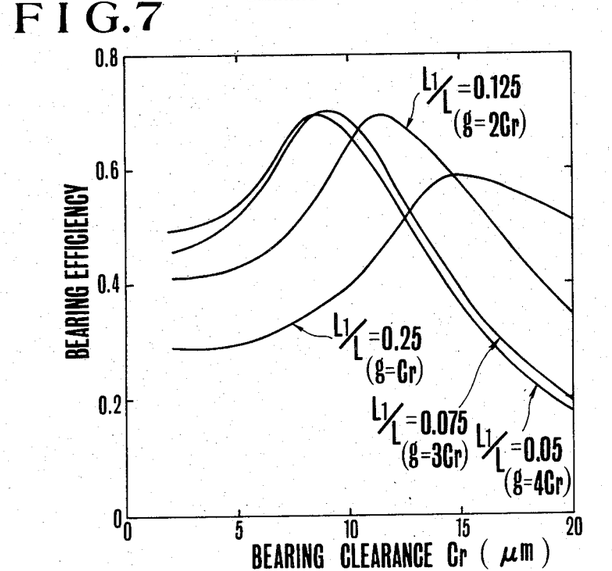
FIG. 7 is a graph showing the relationship between the bearing efficiency and the bearing clearance in the embodiment shown in FIG. 4, in which the exit length to bearing length is taken as a parameter.

FIGS. 6 and 7 are graphs showing the relationship between the bearing efficiency and the bearing clearance Cr for a diameter d of the air supply ports of 0.1 mm, three air supply ports 14, and ratio of bearing length to bearing diameter (L/D) of 1. Specifically, FIG. 6 shows the relationship between the bearing clearance and the bearing efficiency when $L_1/L$ is 0.05 and supplied air pressure is 1 kg/cm$^2$ with the groove depth g taken as a parameter. The optimum depth of the annular groove 13 is about 4 times the bearing clearance Cr whereas the optimum bearing clearance is about 7 microns at which a bearing efficiency of about 0.7 can be obtained. Even when the depth of the annular groove and the bearing clearance deviate slightly from their optimum values, the bearing effeciency does not decrease to any appreciable extent. Where the bearing length-diameter ratio L/D is decreased to ⅔ and ½, the maximum bearing efficiency increases to 0.8 to 0.85 respectively. Depending upon the pressure of the air supplied, the optimum bearing clearance varies slightly. Thus, for the air pressure of 5 and 0.1 kg/cm$^2$, the optimum bearing clearance varies between about 5 and 9 microns, respectively.

FIG. 7 is a graph showing the relationship between the bearing clearance Cr and the bearing efficiency where the air pressure is 0.1 kg/cm$^2$, the diameter of the air supply port is 0.1 mm and the ratio $L_1/L$ is taken as the parameter. It can be noted that variation in the ratio $L_1/L$ causes variation of the optimum depth of the annular grooves that maximizes the bearing efficiency. Fig. 7 shows that $L_1L$ should be made less than 0.1 in order to decrease the bearing clearance below 10 microns. However, the value of $L_1/L$ that satisfies this condition becomes larger when the air pressure is increased and the diameter of the air supply port is decreased.

The existence of the optimum annular groove depth at which the bearing efficiency can be maximized will be better understood by discussing dependency of the circumferential pressure distribution of the annular groove depth.

Figure 8:
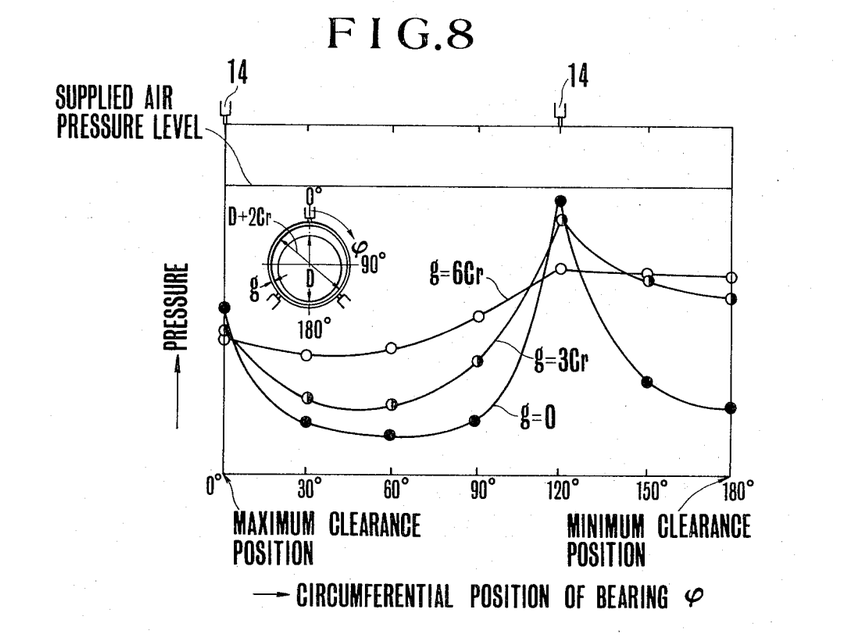
FIG. 8 is a graph showing the circumferential pressure distribution at the bearing surface, in which the depth of the annular grooves is taken as a parameter.

FIG. 8 shows dependency of the circumferential pressure distribution created by the eccentricity of the shaft on the depth g of the circumferential annular groove, where the width of the annular groove is 1 mm and the number of the air supply ports is 3. As can be noted, if the depth of the groove were too large, the short circuiting effect between pressures in the wide bearing clearance region and in the narrow bearing clearance region increases, in other words, the pressure difference between regions $-90° < g < 90°$ and $90° < g < 270°$ decreases so that the capacity of the bearing decreases. Thus, there is an optimum value for the depth g of the annular groove that maximizes the bearing efficiency.

Denoting the bearing clearance by Cr, the bearing diameter by D, the number of the air supply ports by n, the width of the annular groove by b, and the distance between one side of the groove and corresponding bearing end by $L_1$, the optimum depth g of the annular groove can be approximately given by the following equation $$g \approx Cr[\{(D/2n)^2/bL_1\}^{\frac{1}{3}} - 1]$$

For example, where D=28 mm, n=3, b=1 mm, and the $L_1$ =3 mm, then $g/Cr \approx 3$. Generally, the value of ratio g/Cr is in a range of from 1.5 to 6. Where the air supply ports and the annular grooves are located closer to the bearing ends, the bearing efficiency increases and the optimum clearance also decreases. However, if the length $L_1$ of the flow-out passage were too short, error in the configurations would cause variation in the bearing characteristic so that the length $L_1$ should be at least 1 mm. Thus, the air supply ports should be located at positions spaced from the bearing ends by about 5 to 15% of the bearing length.

As can be clearly noted from the foregoing description, the present invention provides a gas or air bearing having a simple construction and providing a high bearing efficiency for a hydrostatic gas bearing with a small clearance of only several microns. As a consequence, it is possible to realize an inexpensive hydrostatic gas bearing which has a large load carrying capacity and a large bearing stiffness. Moreover, most of the bearing surface is so smooth as to be effective to efficiently create a hydrodynamic pressure when the shaft rotates. Thus, according to the embodiment described above, a hybrid gas bearing is obtained which acts as a hydrostatic bearing at the time of starting and stopping wherein the shaft is supported under a contactless condition, and which acts as a hydrodynamic bearing at the time of high speed rotation. For example, in the case where the shaft diameter is 30 mm, effective bearing length is 50 mm, and supplied air pressure is 0.07 kg/cm$^2$, it is possible to support a rotary shaft load of 700 g by an optimum design of the bearing. For this reason, when applied to a rotating head recording device having a weight of less than 500 g, the invention provides a compact and reliable gas bearing capable of starting and stopping under a contactless condition and acting as a hydrodynamic bearing under high speed running conditions, for example from 10,000 to 30,000 r.p.m. by usling low pressure air supplied from a rotary compressor, without the need of oiling for a long time.

When compared with well designed prior art inherent restrictor and orifice restrictor hydrostatic gas bearings, the bearing of this invention can improve the load carrying capacity of the bearing by 30 to 40% and the bearing stiffness by more than 5 times. Moreover, as the number of air supply ports is small and the bearing clearance is small, it is possible to reduce the necessary amount of pressurized gas to below 1/10 that required by the prior art. Also, the invention makes it possible to realize a high efficiency hybrid gas bearing which could never be realized with a conventional inherent restrictor hydrostatic gas bearing. Since the annular grooves can readily be machined, the cost of manufacturing the bearing of this invention is comparable to that of the simplest inherent restrictor bearing.

While the quantity of pressurized gas is substantially equal to that of a surface restrictor hydrostatic gas bearing, the load carrying capacity and the stiffness of the bearing of the invention are improved by more than 1.5 times and the machining cost is reduced to less than a fraction of that required by prior art bearings.

Figure 9:
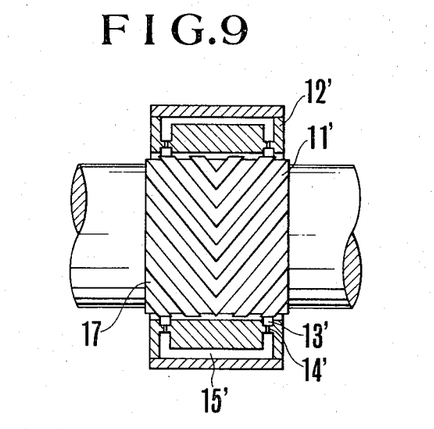
FIG. 9 is a longitudinal sectional view showing a modified embodiment of this invention.

FIG. 9 illustrates a modification of this invention which is different from that shown in FIGS. 4 and 5 in that a shaft 11' is provided with a plurality of, herring bone patterned narrow grooves. A bearing provided with such inclined grooves for sucking outside air into the bearing clearance to create a hydrodynamic pressure for supporting the shaft has been well known. With this construction, however, since the shaft contacts the bearing surface at the time of starting and stopping it is necessary to harden the bearing surface as by using ceramics. This not only increases the manufacturing cost but also reduces reliability. However, when the bearing surface is constructed as illustrated in accordance with teachings of the present invention, it becomes possible to start and stop under contactless condition by intermittently using compressed air supplied from a small and reliable source such as a turbocompressor.

Figures 10A, 10B:
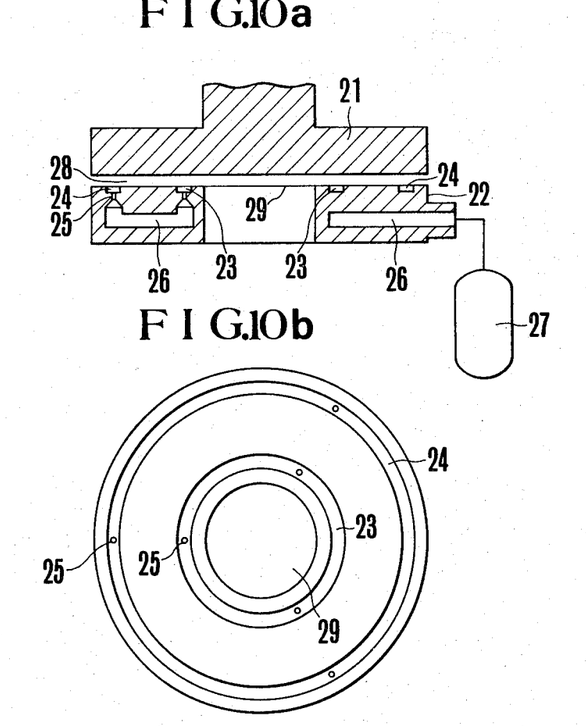

FIGS. 10a and 10b illustrate the application of this invention to a thrust bearing 22 adapted to support a member 21. The circular disc type bearing 22 is provided with a central opening 29 and two concentric, annular grooves 23 and 24, one 23 being located near the central opening 29 while the other 24 near the outer periphery. Each groove is provided with a plurality of (3 in the drawing) circumferentially spaced air supply ports 25 respectively communicating with a common annular air chamber 26 which in turn is connected to a source of pressurized gas 27. The pressurized gas is exhausted to the outside of the bearing through a bearing clearance 28 and the central opening 29. The annular grooves 23 and 24 can be designed in the same manner as in the previous embodiments except that the values of the diameters of the inner and outer annular grooves 23 and 24 are used as D in the aforementioned equation.

Figure 11:
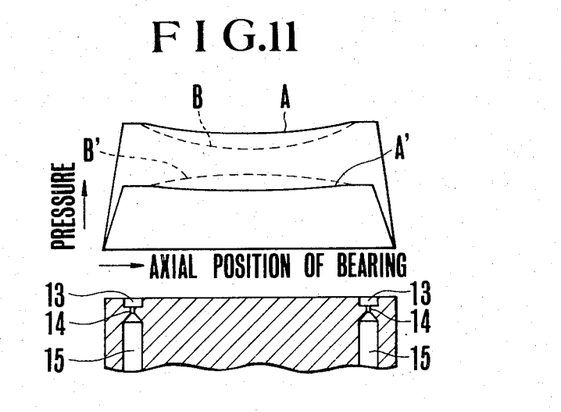
FIG. 11 shows one example of the pressure distribution characteristic in the axial direction inside of the bearing.

In the embodiment shown in FIGS. 4 and 5, where the bearing length L is small and the distance between the annular grooves 13 on opposite ends of the bearing is smaller than the circumferential spacing of the air supply ports 14 (an arcuate length subtending a center angle of 120°), the pressure variation in the direction of the bearing length is small so that the axial pressure distribution varies with increase or decrease in the bearing clearance as shown at trapezoid curves A and A' in FIG. 11. Where the bearing length is larger than the bearing diameter or where the number of the air supply ports is large, the flow resistance in the axial direction of the bearing increases to a value that can not be neglected in relation to the circumferential flow resistance so that the pressure in the high pressure region decreases as shown by curve B and the pressure in the low pressure region increases as shown by curve B'. This is due to the fact that fluid in the high pressure region is directed circumferentially and immigrate into the low pressure region. Such a pressure distribution is not advantageous for the bearing performance.

Figure 12:
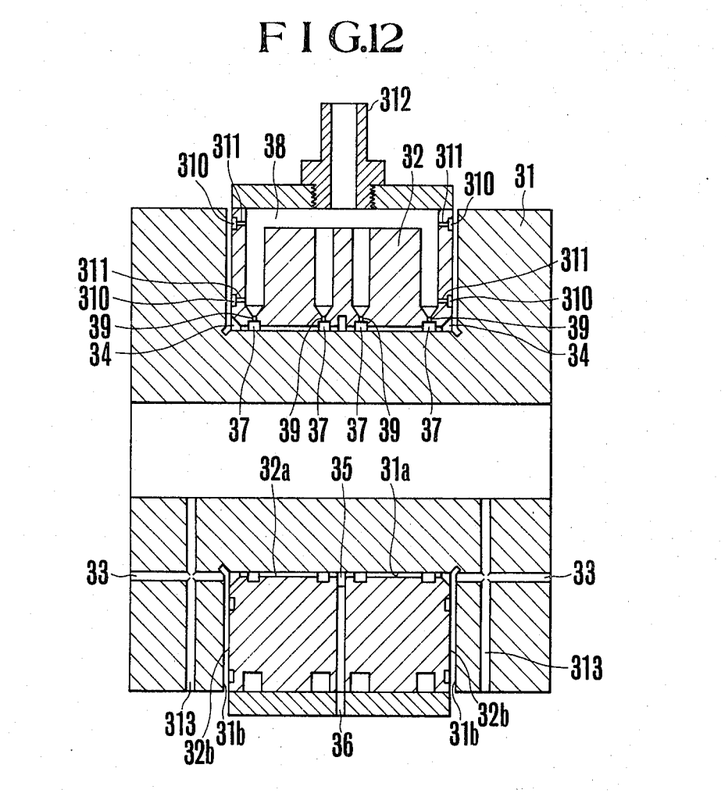
FIG. 12 is a longitudinal sectional view showing still another embodiment of the invention.

FIG. 12 shows another embodiment of this invention designed to eliminate this problem. FIG. 12 shows a combination of a journal bearing having a relatively large bearing length and a thrust bearing as shown in FIGS. 10a and 10b.

Figure 13:
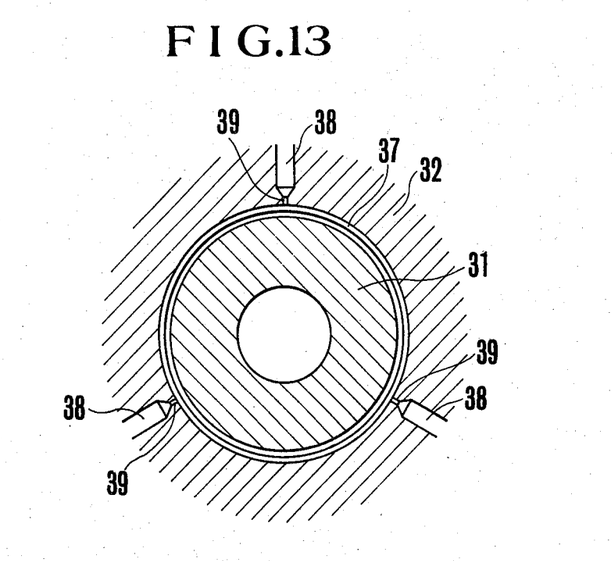
FIG. 13 is a cross-sectional view taken along the air supply ports of the radial bearing of the embodiment shown in FIG. 12.
Figure 14:
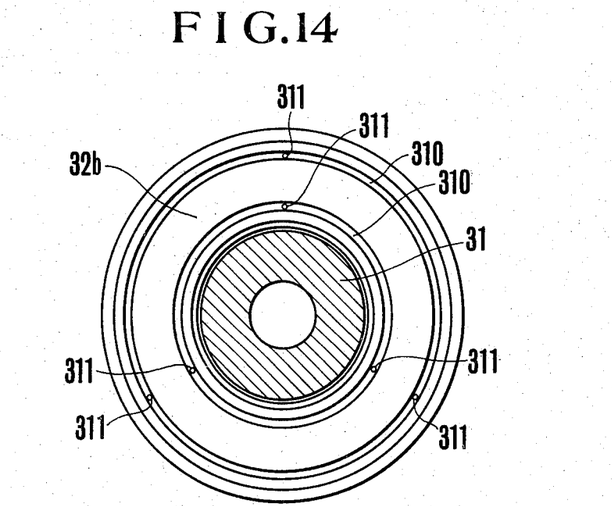
FIG. 14 is a cross-sectional view showing the thrust bearing surface of the embodiment shown in FIG. 12.

As shown in FIGS. 12, 13 and 14, a main body 32 of the bearing is contained in an annular groove defined by a reduced diameter portion 31a of shaft 31 and vertical side walls 31b on the opposite sides thereof. The junctions between the radial bearing surface 32a of the bearing main body 32 and two thrust bearing surfaces 32b are beveled, and the beveled portions are contiguous to circumferential channels 34 which are in communication with the surrounding atmosphere through exhaust passages 33 provided for the rotating shaft 31. Provision of the channel 34 and the exhaust passage 33 prevents interference between the radial bearing and the thrust bearing.

At the center of the radial bearing surface 32a is formed an annular exhaust groove 35 which divides the surface 32a into two. The annular exhaust groove 35 is in communication with the outside through a radial exhaust passage 36 in the rotary shaft 32. Annular grooves 37 are formed near the channel 34 and the divider groove 35. Each annular groove 37 is provided with three small air supply ports 39 which are equally spaced in the circumferential direction and are in communication with a gas passage 38 in the main body of the bearing 32. Each thrust bearing surface 32b is provided with annular grooves 310 near its inner and outer edges, and each annular groove 310 is in communication with the air passage 38 through three equally spaced air supply ports 311. A nipple 312 is provided to connect the air passage 38 to the source of pressurized gas, and a spare exhaust opening 313 is provided for a construction in which the opening 33 is closed.

The pressurized gas supplied to the nipple 312 is transmitted to the gaps between the radial bearing surface 32a and the reduced diameter portion of the rotary shaft 31 and between the thrust bearing surfaces 32b and side walls 31b of the rotary shaft 31 via the air passage 38 and air supply ports 39 and 311 to create bearing pressures for supporting the shaft.

This embodiment is characterized in that the radial bearing surface 32a is divided into two portions by the central annular exhaust groove 35 whereby the ratio of the bearing diameter to the bearing length is made substantially smaller than 1, for example, about 0.5. Thus, according to this embodiment, the effective bearing length is decreased by the central annular groove, thus maintaining the pressure distributions as shown at curves A and A' in FIG. 11 for the purpose of improving the bearing efficiency. Generally, it is suitable to select the axial spacing of the air supply ports to be about ⅔ to ½ of the bearing length. A spacing of less than ½ of the bearing length can not improve the bearing efficiency.

Where it is desired to increase the radial load carrying capacity by increasing the length of the radial bearing, the bearing surface may be divided into 3 to 4 sections by providing 2 or 3 exhaust grooves, in which case two annular grooves and associated air supply ports for supplying air thereto may be provided for each section.

Figure 15:
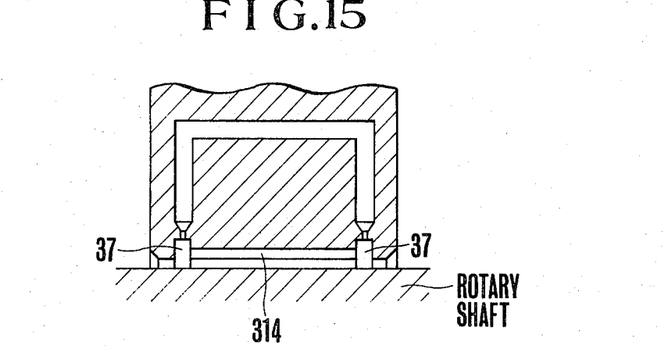
FIG. 15 is a longitudinal sectional view showing a portion of another modification of this invention.

Although in the embodiment shown in FIG. 12 the radial bearing surface was divided by annular exhaust groove 35 so as to make uniform the pressure distribution for a relatively wide bearing length, in a modification shown in FIG. 15, the same object is accomplished by interconnecting annular grooves 37 with a plurality of axial grooves 314 being each shallower than grooves 37.

Figure 16:
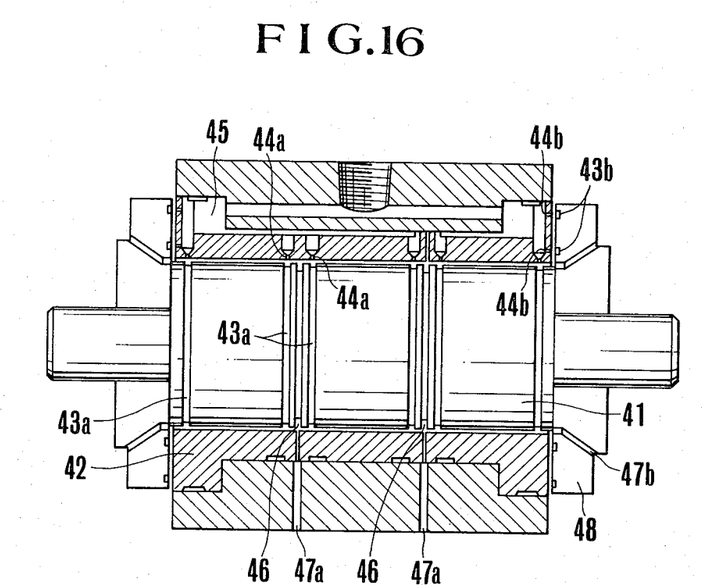
FIG. 16 is a longitudinal sectional view showing still another embodiment of this invention.

Although in the foregoing embodiments, annular grooves were provided for the bearing side, it should be understood that the invention is not limited to this construction. Thus, similar advantages can be attained by providing annular grooves for the shaft as shown in FIG. 16. More particularly, a rotary shaft 41 is provided with circumferential annular grooves 43a about its periphery, while a bearing 42 is provided with air supply ports 44a facing the annular grooves 43a. A thrust bearing plate 48 integral with the shaft is provided with the concentric annular grooves 43b as in FIG. 10b and air supply ports 44b of the bearing face the annular grooves 43b. The air supply ports 44a and 44b are in communication with an air chamber 45. Exhaust passages 47a are opened to the radial bearing surface and exhaust passages 47b are provided for preventing interference between the radial and thrust bearings. Reference numeral 46 designates exhaust grooves for dividing the radial bearing surface.

What is claimed is:

1. In a gas bearing of the type wherein compressed air is supplied from a source thereof to a bearing clearance between a bearing and a rotary shaft for rotatably supporting the same, the improvement wherein said bearing is provided with a plurality of circumferential annular grooves extending about the entire inner surface of the bearing and axially spaced from each other located near opposite ends of said bearing, the axial distance between a groove and the corresponding bearing end being in the range from 5 to 15% of the length of the bearing, a plurality of angularly spaced small diameter gas supply ports in communication with respective annular grooves, and a gas passage for connecting said plurality of gas supply ports to said source of compressed gas the depth of the groove and the bearing clearance satisfying the following relationship:

$$g = Cr \left[ \{(D/2n)^2/bL_1\}^{\frac{1}{3}} - 1 \right]$$

where

Cr is the bearing clearance,
D is the bearing diameter,
n is the number of air supply ports,
b is the annular groove width,
$L_1$ is the distance between one side of the groove and the corresponding bearing end.

2. A gas bearing according to claim 1 wherein the depth of said annular groove is about 1.5–6 times the bearing clearance.

3. A gas bearing according to claim 1 wherein said gas supply ports are substantially equally spaced apart in the circumferential direction.

4. A gas bearing according to claim 1 wherein a plurality of inclined grooves which are patterned into a herringbone geometrical configuration are formed on the surface of said rotary shaft.

5. A gas bearing according to claim 1 which further comprises at least one circumferential annular groove for dividing the inner surface of the bearing, said circumferential annular groove being in communication with a radial exhaust passage, additional circumferential annular grooves in communication with said gas passage and provided near the divider groove, and a plurality of gas supply ports opened to the respective additional annular grooves.

6. A gas bearing according to claim 1 which further comprises a plurality of axial grooves for interconnecting said plurality of annular grooves, said axial grooves having a depth shallower than that of said annular grooves.

7. In a gas bearing of the type wherein compressed gas is supplied from a source thereof to a bearing clearance between a circular disc shaped thrust bearing and a member supported thereby, the improvement wherein said bearing is provided with a central opening; a plurality of concentric annular grooves formed in one surface of the bearing to open into said bearing clearance, an inner one of the annular grooves being located near said central opening, an outer one of the grooves being located near the outer periphery of the bearing; a plurality of small diameter gas supply ports in communication with respective annular grooves and spaced from one other in the circumferential direction; and gas passages communicating said plurality of gas supply ports with said source of compressed gas.

8. A gas bearing according to claim 7 wherein said inner and outer annular grooves are respectively spaced from the central opening and outer periphery of the bearing by a distance of about 5 to 15% of the diameter of the bearing.

9. A gas bearing according to claim 7 wherein said annular grooves have a depth of about 1.5 to 6 times said bearing clearance.

10. A gas bearing according to claim 7 wherein said gas supply ports are substantially equally spaced apart in the circumferential direction.

11. In a gas bearing of the type wherein a rotary shaft is provided with a reduced diameter portion for receiving a bearing to define radial and thrust bearings and pressurized gas is supplied from a source thereof into a radial bearing clearance and a thrust bearing clearance defined by said bearing and the reduced diameter portion, the improvement wherein said radial bearing comprises:

a radial bearing surface;
a plurality of circumferential annular grooves extending about the inner surface of the radial bearing surface near opposite ends thereof and axially spaced from each other, said circumferential annular grooves being opened to the radial bearing clearance;
a plurality of angularly spaced small diameter gas supply ports in communication with respective circumferential annular grooves; and
a gas passage for connecting said plurality of gas supply ports with said source; and wherein said thrust bearing comprises:

a plurality of thrust bearing surfaces;
a plurality of concentric annular grooves formed in each of said thrust bearing surfaces to open into the thrust bearing clearance, an inner one of the concentric annular grooves being located near said radial bearing surface and an outer one of said concentric annular grooves being located near the outer periphery of the rotary shaft; and
a plurality of small diameter gas supply ports in communication with respective concentric annular grooves to connect to said gas passage;

and wherein junctions between said radial bearing surface and said thrust bearing surfaces are in communication with the surrounding atmosphere through exhaust passages extending through said shaft.

12. A gas bearing according to claim 11 which further comprises at least one circumferential annular divider groove for dividing the inner surface of the radial bearing, said divider groove being in communication with a radial exhaust passage, additional circumferential annular grooves in communication with said gas passage and provided near the divider groove, and a plurality of gas supply ports opened to the respective additional annular grooves.

13. In a gas radial bearing of the type wherein pressurized gas is supplied from a source thereof into a bearing clearance between a bearing and a rotary shaft for rotatably supporting said shaft, the improvement wherein said bearing is provided with a plurality of angularly spaced radial small gas supply ports opened to said clearance, said gas supply ports being located close to opposite ends of the bearing surface of said bearing, and a gas supply passage connecting said gas supply ports with said source, and wherein said rotary shaft is provided with a plurality of circumferential annular grooves respectively opposing said gas supply ports and opened to said bearing clearance.

14. In a gas thrust bearing of the type wherein pressurized gas is supplied from a source thereof into a bearing clearance between a bearing and a rotary shaft for rotatably supporting said shaft, the improvement wherein said rotary shaft comprises integral thrust plates opposing opposite ends of the bearing, each of said thrust plates being provided with a plurality of concentric annular grooves opened to the bearing clearance, an inner one of the grooves being located near the inner circumferential surface of the bearing and an outer one of the grooves being located near the outer periphery of the thrust plate, and wherein said bearing is provided with a plurality of concentric, axial small gas supply ports opened to said bearing clearance, said gas supply ports opposing said concentric annular grooves of the rotary shaft and spaced apart angularly, and a gas supply passage connecting said gas supply ports with said source.

* * * * *